United States Patent
Møller et al.

(10) Patent No.: US 10,614,856 B2
(45) Date of Patent: Apr. 7, 2020

(54) AUDIO TIME SYNCHRONIZATION USING PRIORITIZED SCHEDULE

(71) Applicant: Roku, Inc., Los Gatos, CA (US)

(72) Inventors: Brian Thoft Moth Møller, Aalborg SV (DK); Paul Fleischer, Aarhus V (DK); Bjørn Reese, Aarhus V (DK)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 15/547,111

(22) PCT Filed: Jan. 27, 2016

(86) PCT No.: PCT/DK2016/050023
§ 371 (c)(1),
(2) Date: Jul. 28, 2017

(87) PCT Pub. No.: WO2016/119794
PCT Pub. Date: Aug. 4, 2016

(65) Prior Publication Data
US 2018/0012632 A1 Jan. 11, 2018

(30) Foreign Application Priority Data
Jan. 28, 2015 (DK) .................. 2015 70046

(51) Int. Cl.
*G06F 17/00* (2019.01)
*G11B 27/10* (2006.01)
(Continued)

(52) U.S. Cl.
CPC .......... *G11B 27/10* (2013.01); *H04N 21/4307* (2013.01); *H04N 21/4394* (2013.01);
(Continued)

(58) Field of Classification Search
None
See application file for complete search history.

(56) References Cited

U.S. PATENT DOCUMENTS

| 4,731,676 A | * | 3/1988 | Berlekamp | G11B 20/1407 360/26 |
| 4,907,080 A | * | 3/1990 | Campbell | G06K 9/00154 348/161 |

(Continued)

FOREIGN PATENT DOCUMENTS

| WO | WO 2006/053704 A1 | 5/2006 |
| WO | WO 2012/018300 A2 | 2/2012 |
| WO | WO 2013/184792 A1 | 12/2013 |

OTHER PUBLICATIONS

International Search Report issued in related application dated Jun. 3, 2016.
(Continued)

*Primary Examiner* — Mustafa A Amin
(74) *Attorney, Agent, or Firm* — Sterne, Kessler, Goldstein & Fox P.L.L.C.

(57) ABSTRACT

Disclosed herein are device, method, and computer program product embodiments for synchronizing playback of audio and/or video content. An embodiment operates by a first device in concert with a second device to collectively select a preferred synchronization mechanism over a third device's default synchronization mechanism such that the third device serves as a session leader. The preferred synchronization mechanism's selection is in accordance with a predetermined prioritized synchronization list comprising the default and preferred synchronization-mechanisms and a virtual clock generated from a timing of an audio codec used for streaming the audio and/or video content. The session leader's default synchronization mechanism has a lower level of priority than the first and second devices' preferred synchronization mechanism. The preferred synchronization mechanism provides a more precise level of synchronization for playback of the audio and/or video content than the default synchronization mechanism.

22 Claims, 2 Drawing Sheets

(51) Int. Cl.
- *H04N 21/43* (2011.01)
- *H04N 21/436* (2011.01)
- *H04N 21/439* (2011.01)
- *H04N 21/44* (2011.01)
- *H04N 21/654* (2011.01)

(52) U.S. Cl.
CPC . *H04N 21/43615* (2013.01); *H04N 21/44008* (2013.01); *H04N 21/654* (2013.01)

(56) References Cited

U.S. PATENT DOCUMENTS

| | | | | |
|---|---|---|---|---|
| 6,173,022 B1* | 1/2001 | McPherson | | G11B 20/00992 360/26 |
| 6,192,397 B1 | 2/2001 | Thompson | | |
| 6,372,974 B1* | 4/2002 | Gross | | G10H 1/0058 84/600 |
| 6,598,172 B1 | 7/2003 | VanDeusen et al. | | |
| 7,301,092 B1* | 11/2007 | McNally | | G10H 1/368 84/612 |
| 7,500,176 B2* | 3/2009 | Thomson | | G10H 1/368 715/202 |
| 7,631,119 B2* | 12/2009 | Moore | | H04N 21/4143 700/94 |
| 2003/0017823 A1* | 1/2003 | Mager | | H04M 1/22 455/414.1 |
| 2003/0018662 A1* | 1/2003 | Li | | H04N 21/4305 715/203 |
| 2003/0164845 A1* | 9/2003 | Fayan | | G11B 27/031 715/722 |
| 2005/0028195 A1* | 2/2005 | Feinleib | | H04N 7/163 725/32 |
| 2005/0111827 A1* | 5/2005 | Sullivan | | G11B 27/3036 386/207 |
| 2005/0198549 A1* | 9/2005 | Courant | | H04L 7/0083 713/400 |
| 2005/0213826 A1* | 9/2005 | Neogi | | G06K 9/00711 382/232 |
| 2005/0217462 A1* | 10/2005 | Thomson | | G10H 1/368 84/612 |
| 2005/0227674 A1* | 10/2005 | Kopra | | H04M 1/72522 455/414.1 |
| 2006/0146850 A1* | 7/2006 | Virdi | | H04N 7/18 370/412 |
| 2006/0149850 A1* | 7/2006 | Bowman | | G11B 27/10 709/231 |
| 2006/0156375 A1* | 7/2006 | Konetski | | H04N 5/76 725/135 |
| 2006/0161835 A1 | 7/2006 | Panabaker et al. | | |
| 2006/0179160 A1* | 8/2006 | Uehara | | H04L 65/80 709/248 |
| 2006/0227245 A1* | 10/2006 | Poimboeuf | | G11B 27/10 348/512 |
| 2006/0242106 A1* | 10/2006 | Bank | | G06F 17/30038 |
| 2006/0270395 A1* | 11/2006 | Dhawan | | H04M 1/7253 455/418 |
| 2007/0079352 A1* | 4/2007 | Klein, Jr. | | H04N 7/17318 725/135 |
| 2007/0136769 A1* | 6/2007 | Goldberg | | G10H 1/0025 725/81 |
| 2007/0143493 A1* | 6/2007 | Mullig | | G06F 17/30017 709/232 |
| 2007/0250761 A1* | 10/2007 | Bradley | | H04L 29/06027 715/203 |
| 2008/0120501 A1* | 5/2008 | Jannink | | G06F 17/30017 713/163 |
| 2008/0168182 A1* | 7/2008 | Frank | | G06F 1/12 709/248 |
| 2009/0135854 A1* | 5/2009 | Bettin | | H04J 3/0632 370/503 |
| 2009/0222520 A1* | 9/2009 | Sloo | | H04N 7/17318 709/205 |
| 2013/0155209 A1* | 6/2013 | Hara | | H04N 13/341 348/55 |
| 2014/0181270 A1 | 6/2014 | Millington | | |
| 2014/0269776 A1 | 9/2014 | Bomfim et al. | | |

OTHER PUBLICATIONS

Written Opinion issued in related application dated Jun. 3, 2016.
Yen et al.; On the Synchronization Mechanisms for Multimedia Integrated Services Networks, School of Electrical and Computer Engineering; Georgia Institute of Technology, Atlanta, GA; Nov. 13, 1994, pp. 168-184.

* cited by examiner

AUDIO TIME SYNCHRONIZATION USING PRIORITIZED SCHEDULE

FIELD OF THE INVENTION

The present invention relates to the field of synchronized playback of audio or video between devices in a peer-to-peer computer network system, e.g. in a wi-fi network.

BACKGROUND OF THE INVENTION

In synchronized playback of audio or video between a plurality of devices in a peer-to-peer computer network system, the devices can participate in coordinated sessions, where the participating devices can play synchronously. The participating devices can be located within or across several rooms.

One of the key parameters of providing precise audio playback synchronization is the ability to maintain a common reference time between multiple loudspeakers in a peer-to-peer audio playback network system. E.g. precise timing between left and right stereo loudspeaker in a stereo setup is crucial in order to obtain a perceived stereo image without any perceivable displacement of the spatial location of the center of the stereo image. Even timing differences below hundreds of microseconds between left and right loudspeaker in a stereo setup may result in a disturbed stereo image. Further, synchronization is required of audio and video between e.g. a loudspeaker device playing the audio part and a display device, e.g. a TV set, showing the video part of audio/video material. The synchronization requirements between the TV and the loudspeakers are orders-of-magnitude lower than the requirements between stereo loudspeakers.

In order to playback synchronously, the participating devices need to agree on the playback time and pace. One of the key parameters of providing precise audio playback synchronization is the ability to share the same time between multiple devices in a network, especially a wireless network.

Solutions exist that have various means to achieve synchronized audio playback in wireless computer networks. Some of these systems use the system clock of the devices, others provide a hardware solution requiring each of the nodes in the network to run with dedicated hardware. Even when working without adjusting the system clocks as provided by the operating system, these solutions often use clocks that are derived from the system clock, adjusted with a frequency and offset component to match some remote system. However, such synchronization is in general not accurate.

SUMMARY OF THE INVENTION

Thus, according to the above description, it is an object of the present invention to provide an accurate way of providing synchronized playback of audio and/or video in a computer network of a plurality of devices.

In a first aspect, the invention provides a method for synchronizing playback of audio and/or video from a source in computer network of a plurality of separate devices in a computer network session.

In this method, the best-effort session synchronization mechanism is selected from a hierarchy of heterogeneous synchronization mechanisms. In other words, a prioritized schedule is used to select the synchronization mechanism to be used.

Such method provides a general way of allowing different types of devices to be combined to playback time synchronous audio and/or video in a computer network session, and to still obtain the most precise time synchronization possible.

A session is directed by a session master (or session leader) which has a lowest common denominator synchronization mechanism. Subsets of participating devices may group together to use a better synchronization mechanism within the group, with a group master that synchronizes the group with the session master (session leader).

By using different synchronization mechanisms for different separate devices in a session, it is possible to achieve a better synchronization between devices with higher synchronization requirements, such as between the left and right loudspeakers for stereo audio playback. In comparison, the synchronization between two devices located in different rooms is relaxed, and can thus be implemented by another synchronization mechanism.

A number of embodiments and/or preferred features will be later discussed and defined.

By 'audio clock' is understood a synchronization mechanism provided by the audio codec used to stream the audio of the audio and/or video content.

In a second aspect, the invention provides a protocol for controlling a plurality of separate devices in a computer network.

In a third aspect, the invention provides a computer executable program code, or a programmable- or fixed hardware, and/or combination hereof, arranged to perform the method according to the first aspect, or causes a device with a processor to function according to the protocol of the second aspect. The computer executable program code may be stored on a data carrier. The program code may be implemented to function on any type of processor platform.

In a fourth aspect, the invention provides a device that operates according to the method or protocol of the first or second aspect. Especially, the device may be an audio device, such as a stand alone active loudspeaker. The device may also be any other type of device with audio and/or video capabilities, e.g. a TV set.

In a fifth aspect, the invention provides a system of a plurality of devices according to the fourth aspect, e.g. mixed types of devices arranged to take part in a computer network session, e.g. a wi-fi network session, of synchronized playback of audio and/or video content.

In a sixth aspect, the invention provides an electronic chip programmed to allow a device to operate according to protocol according to the third aspect, if provided with access to the electronic chip, e.g. if the device has the chip installed therein.

It is appreciated that the same advantages and embodiments described for the first aspect apply as well for the second, third, fourth, fifth, and sixth aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
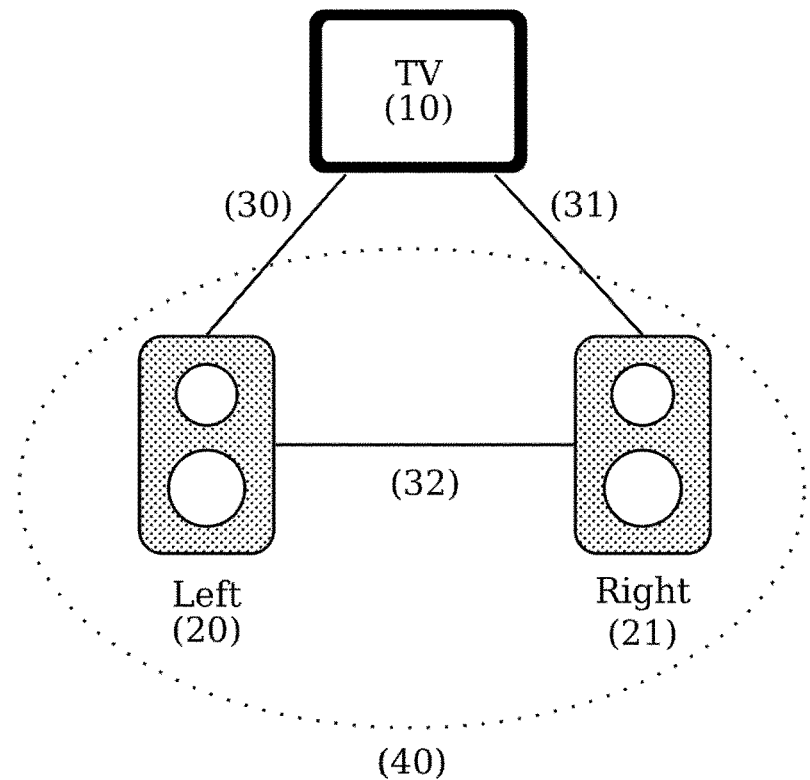
FIG. 1 shows a synchronization session with a TV (10) and a stereo set of loudspeakers, left and right (20 and 21), where the TV (10) is the session master (leader) and therefore provides the overall synchronization (30 and 31)

FIG. 1 shows a synchronization session with a TV (10) and two speakers (20 and 21). The TV (10) is the session master and therefore provides the overall synchronization (30 and 31). The Right speaker (21) and the Left speaker (20) form a group (40) wherein the Right speaker (21) acts as the group master. The group master (21) synchronizes against the session master (10). The Left speaker (20) ignores the synchronization from the session master (10) and instead uses the synchronization (32) from the group master (21).

Figure 2:
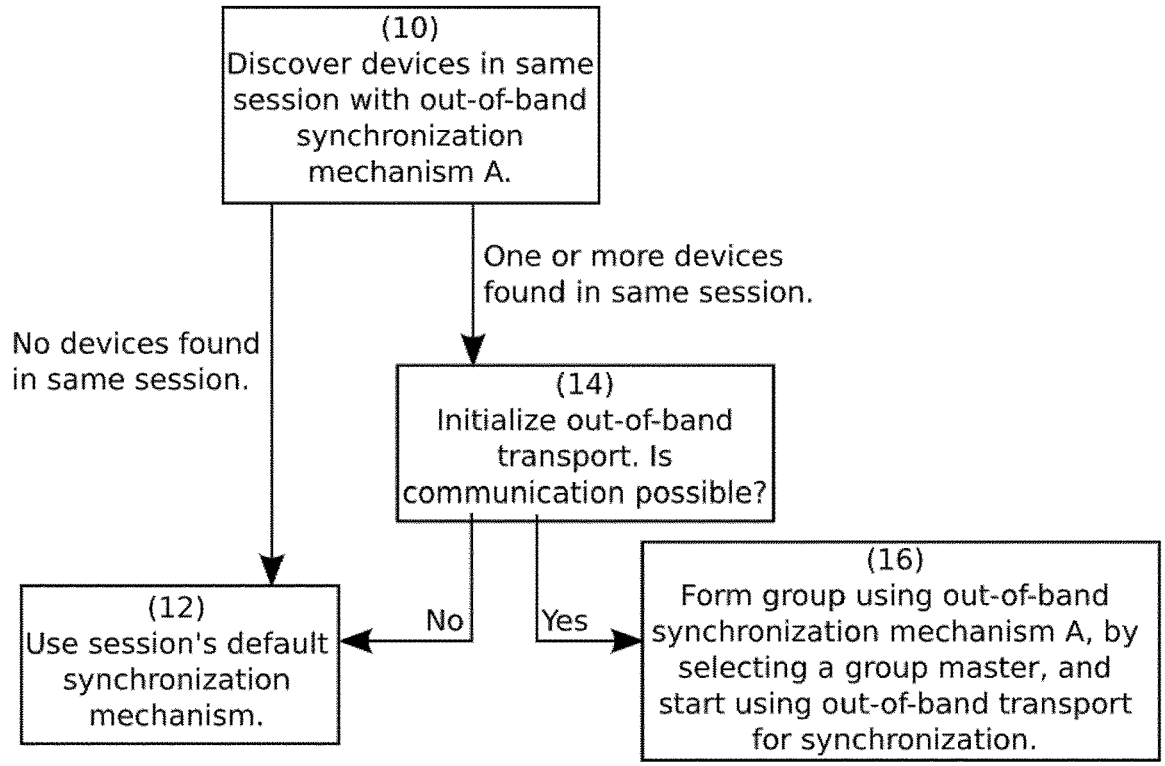
FIG. 2 illustrates a synchronization mechanism selection algorithm embodiment.

FIG. 2 illustrates a synchronization mechanism selection algorithm.

Figure 3:
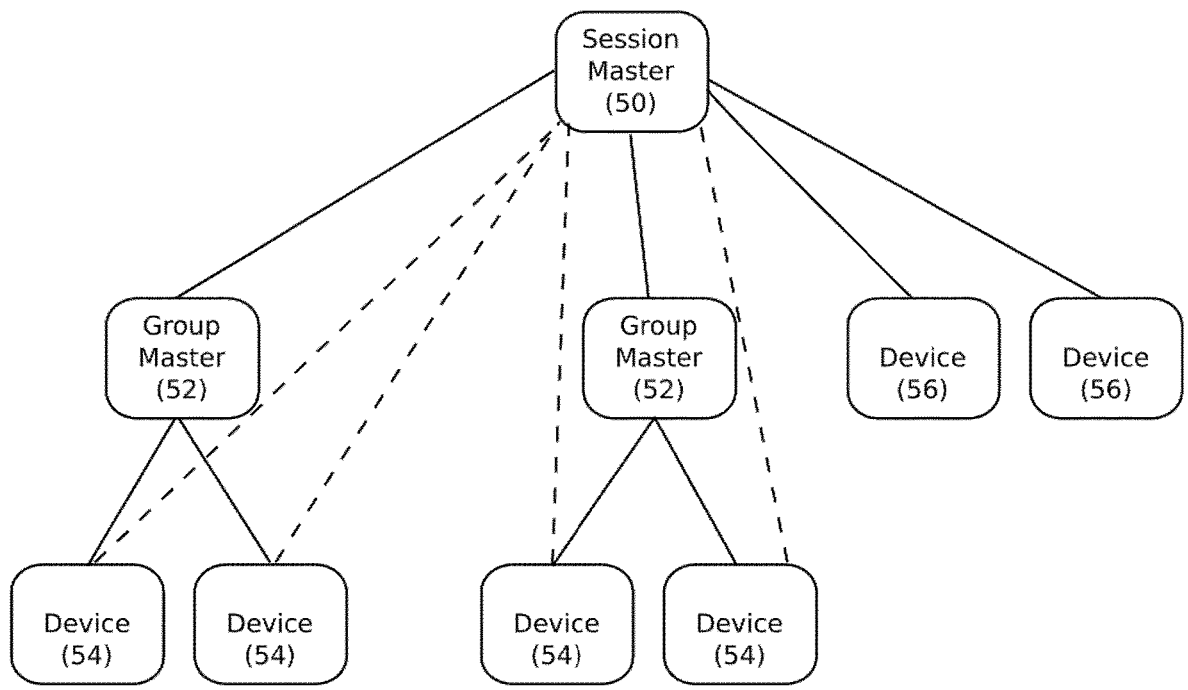
FIG. 3 illustrates an example of a synchronization hierarchy. The session master (leader) (50) is the authoritative time synchronization source for the session, and it provides timing information to all other devices (52), (54), and (56) via the session's default synchronization. Two groups have been formed with an out-of-band synchronization, each group having a group master (leader) (52) and two group members (54).

FIG. 3 illustrates a synchronization hierarchy: The session master (50) is the authoritative time source for the session. It provides timing information to all other devices (52), (54), and (56) via the session's default synchronization. Two groups have been formed with an out-of-band synchronization. Each group has a group master (52) and two group members (54). These use an out-of-band synchronization mechanism. As indicated by the dashed line, (54) still utilizes the default synchronization with the session master (50).

The group masters (52) also maintain a direct synchronization with the Session Master (50). Devices (56) do not use any out-of-band synchronization, and fall back to the default synchronization with the session master (50).

Figure 4:
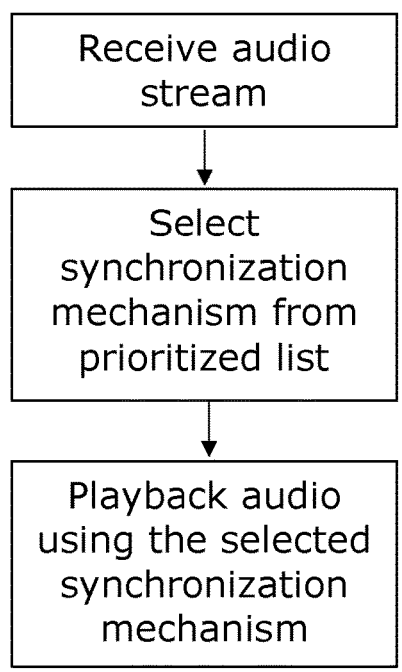
FIG. 4 illustrates steps of a clock synchronization selection algorithm embodiment.

FIG. 4 illustrates a simple example of a selection algorithm implemented in each of the separate devices taking part in a computer network session of synchronous playback of audio and/or video.

In a specific example, the prioritized list of synchronization mechanisms may include two or more of the following, in prioritized order:
1) a custom radio frequency (RF) based synchronization mechanism,
2) a custom infrared (IR) based synchronization mechanism,
3) a Global Positioning System (GPS) based synchronization mechanism,
4) a standard radio clock (e.g. DCF77 or WWVB) based synchronization mechanism, and
5) a Network Time Protocol (NTP) based synchronization mechanism.

To sum up: the invention provides a method for providing a synchronization in a computer network for synchronized playback of audio and/or video by a plurality of separate devices, e.g. in a wi-fi network. Each separate device is programmed to select a synchronization mechanism in accordance with a predetermined prioritized list of at least two different synchronization mechanisms, and to use the selected synchronization mechanism for synchronizing audio and/or video playback. E.g. use of a clock based on the audio codec clock can be set to a higher priority than use of the system clock, which provides a poorer precision. A session leader serves to provide the synchronization to other separate devices in a session, however a group of two or more separate devices within the session may agree on selecting a synchronization mechanism providing a higher precision than the one provided by the session leader. E.g. to allow high precision timing between separate left and right loudspeakers in a stereo setup. A group leader can be elected to provide synchronization to a group of devices using a higher synchronization precision than the synchronization mechanism provided by the overall session leader. E.g. a dedicated synchronization channel separate from the audio/video streaming channel may be selected.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for synchronizing playback of audio and/or video content, the method comprising:
    collectively selecting, by a first device in concert with a second device of a plurality of separate devices in a computer network session, a preferred synchronization mechanism over a default synchronization mechanism provided by a third device of the plurality of separate devices such that the third device serves as a session leader in the computer network session,
    wherein the selection of the preferred synchronization mechanism is in accordance with a predetermined prioritized synchronization list comprising the default synchronization mechanism, the preferred synchronization mechanism, and a virtual clock generated in response to a timing of an audio codec used for streaming the audio and/or video content,
    wherein the default synchronization mechanism provided by the session leader has a lower level of priority than the preferred synchronization mechanism collectively selected by the first device and the second device in the predetermined prioritized synchronization list,
    wherein the preferred synchronization mechanism provides a more precise level of synchronization for playback of the audio and/or video content than the default synchronization mechanism, and
    wherein the preferred synchronization mechanism and the default synchronization mechanism are used for synchronizing playback of the audio and/or video content.

2. The method according to claim 1, further comprising:
    electing, by the plurality of separate devices, one of the plurality of separate devices in the computer network session as a new session leader.

3. The method according to claim 2, further comprising:
searching, by the plurality of separate devices, within the computer network session for one or more additional separate devices; and
forming, by the plurality of separate devices, a group of separate devices within the computer network session to agree on the preferred synchronization mechanism.

4. The method according to claim 3, further comprising:
electing, by the plurality of separate devices, one of the group of separate devices as a group leader for providing synchronization according to the preferred synchronization mechanism,
wherein the group leader serves to synchronize the group of separate devices with the synchronization provided by the new session leader, and
wherein the group of separate devices comprises a first audio device arranged to playback a left stereo channel of an audio stream and a second audio device arranged to playback a right stereo channel of the audio stream.

5. The method according to claim 1, wherein the predetermined prioritized synchronization list comprises at least one synchronization mechanism which operates within a communication channel on which the audio and/or video content is streamed.

6. The method according to claim 1, wherein the predetermined prioritized synchronization list comprises at least one synchronization mechanism which operates on a communication channel separate from a communication channel on which the audio and/or video content is streamed.

7. The method according to claim 6, wherein the audio and/or video content is streamed via a wi-fi channel, and wherein synchronization is provided via a wireless channel different than the wi-fi channel.

8. The method according to claim 1, wherein the predetermined prioritized synchronization list comprises at least: 1) use of the audio codec as the preferred synchronization mechanism, and 2) use of a system clock in each of the plurality of separate device as the preferred synchronization mechanism.

9. The method according to claim 1, wherein the predetermined prioritized synchronization list comprises at least two of: 1) a custom radio frequency based synchronization mechanism, 2) a custom infrared based synchronization mechanism, 3) a global positioning system based synchronization mechanism, 4) a standard radio clock based synchronization mechanism, and 5) a network time protocol server based synchronization mechanism.

10. The method according to claim 1, wherein the predetermined prioritized synchronization list comprises at least three different synchronization mechanisms.

11. The method according to claim 1, wherein the virtual clock is generated in response to a clock system of the audio codec or to periodic measurements of the audio codec.

12. The method according to claim 2, further comprising:
electing, by the plurality of separate devices, a second one of the plurality of separate devices in the computer network session as a backup session leader when the elected one of the plurality of separate devices is unavailable to serve as the new session leader.

13. The method according to claim 1, wherein the predetermined prioritized synchronization list comprises a custom radio frequency based synchronization mechanism having a higher priority than a standard radio clock based synchronization mechanism.

14. The method according to claim 4, wherein the new session leader is separate from the group of separate devices.

15. The method according to claim 4, wherein the group leader is in direct communication with the session leader.

16. The method according to claim 4, wherein the session leader is an authoritative time source for the group of separate devices and provides time information to each device in the group of separate devices via the preferred synchronization mechanism.

17. The method according to claim 4, wherein the group leader employs a selected synchronization mechanism different than the preferred synchronization mechanism of the new session leader.

18. The method according to claim 17, wherein each device of the group of separate devices uses the selected synchronization mechanism of the group leader instead of the preferred synchronization mechanism of the session leader.

19. The method according to claim 18, wherein each device of the group of separate devices falls back to the preferred synchronization mechanism of the session leader.

20. A non-transitory, computer-readable device having instructions stored thereon that, when executed by a device, cause the device to perform operations comprising:
collectively selecting, by a first in concert with a second device of a plurality of separate devices in a computer network session, a preferred synchronization mechanism over a default synchronization mechanism provided by a third device of the plurality of separate devices such that the third device serves as a session leader in the computer network session,
wherein the selection of the preferred synchronization mechanism is in accordance with a predetermined prioritized synchronization list comprising the default synchronization mechanism, the preferred synchronization mechanism, and a virtual clock generated in response to a timing of an audio codec used for streaming audio and/or video content,
wherein the default synchronization mechanism provided by the session leader has a lower level of priority than the preferred synchronization mechanism collectively selected by the first device and the second device in the predetermined prioritized synchronization list,
wherein the preferred synchronization mechanism provides a more precise level of synchronization for playback of the audio and/or video content than the default synchronization mechanism, and
wherein the preferred synchronization mechanism and the default synchronization mechanism are used for synchronizing playback of the audio and/or video content.

21. A non-transitory computer-readable storage device having instructions stored thereon that, when executed by at least one computing device, cause the at least one computing device to perform operations comprising:
collectively selecting, by a first in concert with second device of a plurality of separate devices in a computer network session, a preferred synchronization mechanism over a default synchronization mechanism provided by a third device of the plurality of separate devices such that the third device serves as a session leader in the computer network session,
wherein the selection of the preferred synchronization mechanism is in accordance with a predetermined prioritized synchronization list comprising the default synchronization mechanism, the preferred synchronization mechanism, and a virtual clock generated in response to a timing of an audio codec used for streaming audio and/or video content, wherein the default synchronization mechanism provided by the session leader has a lower level of priority than the preferred synchronization mechanism collectively selected by the first device and second device in the predetermined prioritized synchronization list, wherein the preferred synchronization mechanism provides a more precise level of synchronization for playback of the audio and/or video content than the default synchronization mechanism, and wherein the preferred synchronization mechanism and the default synchronization mechanism are used for synchronizing playback of the audio and/or video content.

22. A device comprising a processor and a network interface arranged to receive audio and/or video content via a computer network session from a source in a synchronized manner in response to synchronization information, wherein the processor is programmed to:

collectively select, by a first in concert with a second device of a plurality of separate devices in the computer network session, a preferred synchronization mechanism over a default synchronization mechanism provided by a third device of the plurality of separate devices such that the third device serves as a session leader in the computer network session, wherein the selection of the preferred synchronization mechanism is in accordance with a predetermined prioritized synchronization list comprising the default synchronization mechanism, the preferred synchronization mechanism, and a virtual clock generated in response to a timing of an audio codec used for streaming the audio and/or video content, wherein the default synchronization mechanism provided by the session leader has a lower level of priority than the preferred synchronization mechanism collectively selected by the first device and the second device in the predetermined prioritized synchronization list, wherein the preferred synchronization mechanism provides a more precise level of synchronization for playback of the audio and/or video content than the default synchronization mechanism; and wherein the preferred synchronization mechanism and the default synchronization mechanism are used for synchronizing playback of the audio and/or video content.

* * * * *